UNITED STATES PATENT OFFICE.

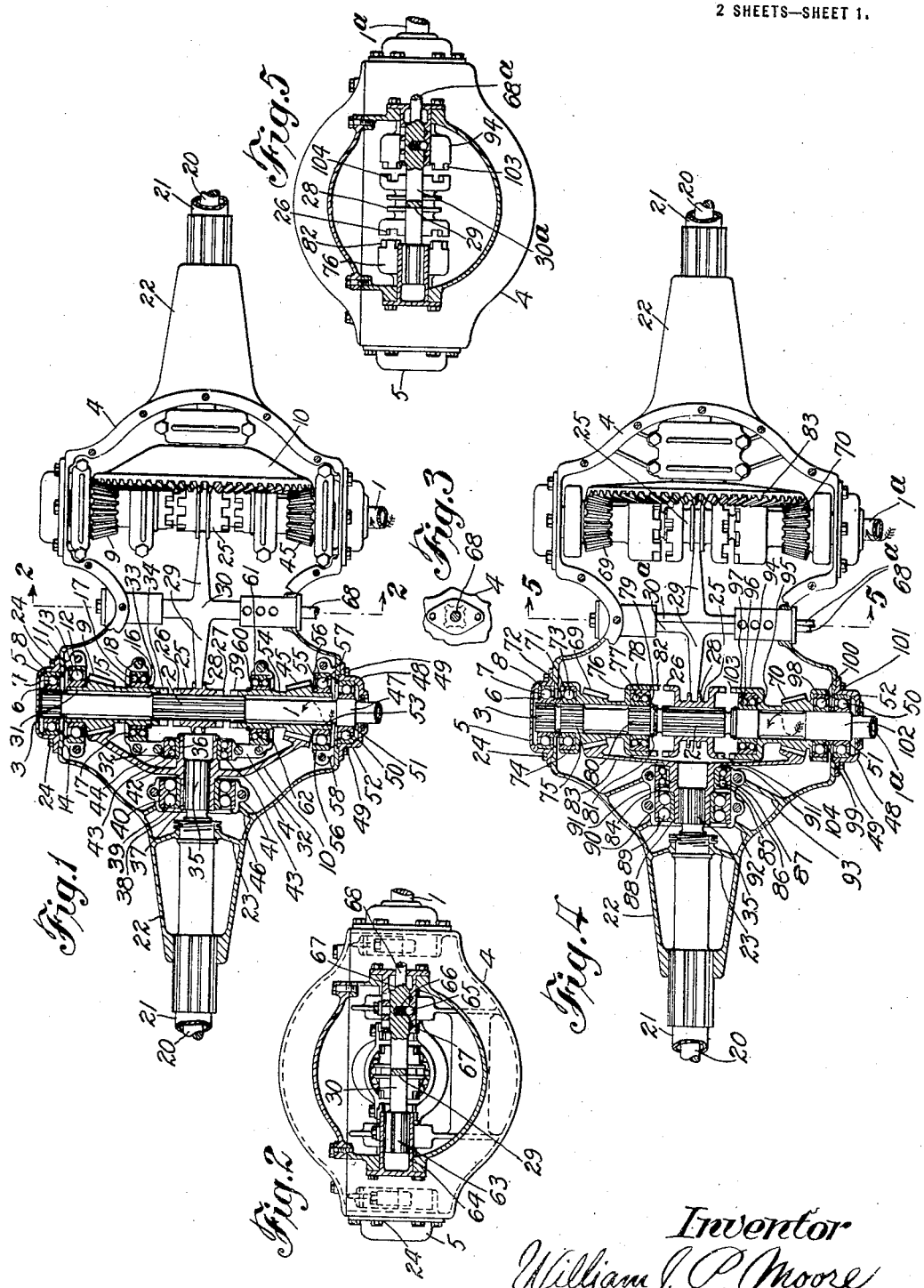

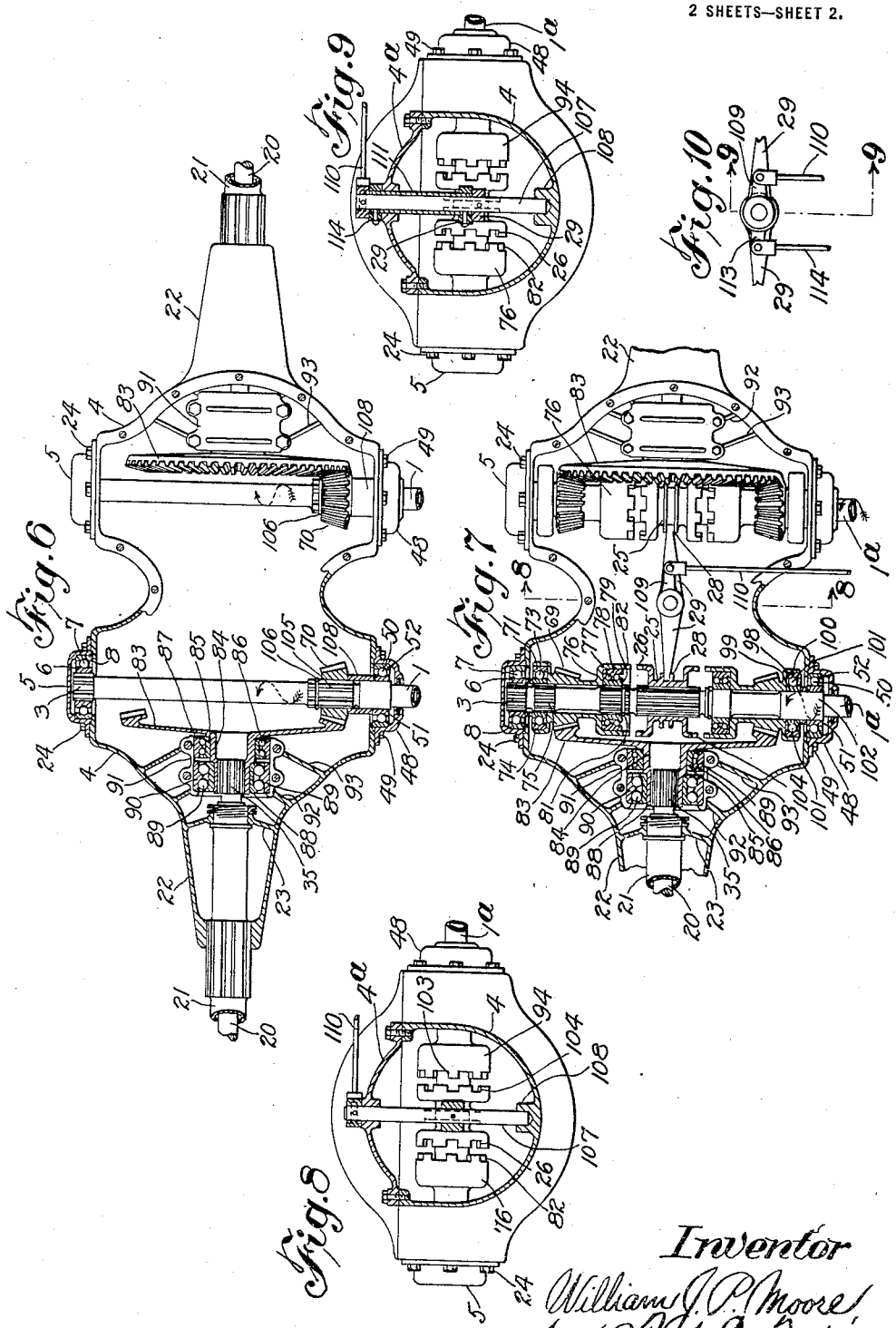

WILLIAM J. P. MOORE, OF NEW YORK, N. Y.

DRIVING MECHANISM.

1,251,557.  Specification of Letters Patent.  Patented Jan. 1, 1918.

Application filed March 10, 1916. Serial No. 83,341.

*To all whom it may concern:*

Be it known that I, WILLIAM J. P. MOORE, a citizen of the United States, residing at New York, in the county of New York and State of New York, have invented certain new and useful Improvements in Driving Mechanism, of which the following is a specification, reference being had therein to the accompanying drawing.

My present invention refers to novel and ingenious improvements in mechanism for transmitting power from parallel rotary driving elements extending in one direction to separate driving elements lying at right angles thereto, and is particularly adapted for transmitting power from a pair of longitudinal shafts of an automobile or other vehicle to separate drive shafts placed at right angles and arranged, for example, in connection with the rear axle in the case of a rear wheel drive, though susceptible of other applications when the drive is with the same or other wheels. One of the leading objects of the invention among numerous ones which might be specified is to dispense with the differential gearing which is commonly employed for enabling a single longitudinal drive shaft to transmit power to a single transverse shaft carrying drive wheels at the ends thereof, and to substitute for such differential gearing means whereby the members of a pair of wheels may be each driven with a positive movement either forward or back in a straight line or on a curve, both drive wheels being given the same direction of rotation or opposite directions of rotation, at the same or different speeds, all arranged properly in order that each wheel may have power positively applied thereto by the actuating agency therefor so that there will be no slipping or uncertain movement of the wheels, but they will be absolutely under control at all times, the many disadvantages of the differential gearing referred to being thereby avoided.

The invention, therefore, consists essentially in a pair of longitudinal main actuating shafts or members driven in any desired manner and a pair of right-angled shaft sections to which the main shafts are connected by suitable gearing and arranged in connection with the rear axle of an automobile or otherwise, together with clutch mechanism for connecting the longitudinal shafts jointly or independently with the transverse shaft sections in order that the latter may be caused to rotate in the same or opposite directions; and also the invention comprises numerous details and peculiarities in the construction, arrangement, and combination of the various parts, substantially as will be hereinafter described and then more particularly pointed out in the ensuing clauses of claim.

In the accompanying drawing illustrating my invention:

Figure 1 is a longitudinal section of my improved power transmission gearing for imparting a positive driving action independently or jointly to the driving wheels of an automobile or similar vehicle, certain parts being illustrated in plan view.

Fig. 2 is a cross-section of the same on the line 2, 2 of Fig. 1.

Fig. 3 is a detail sectional end view showing a part of the clutch shifting device.

Fig. 4 is a longitudinal horizontal section in partial plan of a modified form of the invention.

Fig. 5 is a cross-section on the line 5, 5 of Fig. 4.

Fig. 6 is a longitudinal horizontal sectional plan view of a further modified form of the invention.

Fig. 7 is a horizontal sectional view in partial plan similar to Fig. 4, but representing a modified form of mechanism for operating the clutch devices.

Fig. 8 is a transverse sectional elevation on the line 8, 8 of Fig. 7.

Fig. 9 is a transverse sectional elevation similar to Fig. 8, but indicating the modified mechanism which is partly illustrated in Fig. 10, the section being taken on the line 9, 9 of Fig. 10.

Fig. 10 is a detail plan view showing further modifications in the mechanism for shifting the clutch devices.

Similar characters of reference designate corresponding parts throughout the different figures of the drawing.

Referring first to the form of the invention illustrated in Fig. 1, 1, 1 designate parallel longitudinal drive shafts of an automobile or other vehicle, said shafts being of greater or less length and placed at a greater or less distance apart, and designed to be driven in opposite directions of rotation by separate motors or by a single motor properly intergeared therewith; these motors not being shown as they form no part of the present invention. Therefore, as I am not concerned in the present invention with the power for driving these shafts I have not shown the forward ends or the mechanical devices connected therewith at the front but only the rear supports, gears, and the like, together with the casing or housing 4 which is entered by the rear ends of these shafts, said casing containing various mechanical features relating to the invention and being suitably shaped for its purpose, said housing also receiving at right angles to the shafts 1 the drive shaft sections 20 which are preferably axially alined with but are independent of each other, and which are inclosed within the tubular axle sections 21 that enter the laterally-extended portions 22 of the housing 4 and are properly supported by the internal webs 23 or other suitable means for giving a rigid and efficient support to these parts.

Referring again to the form of the invention illustrated in Fig. 1 and assuming that the two shafts 1 are similarly constructed, supported and arranged in connection with similar gears and other parts, it will be seen that the rear end of each shaft 1 is provided with a splined terminal portion 3, the splines of which engage a ring 6 constituting one raceway of a ball bearing having a series of balls 7 which lie between the ring 6 and another ring 8 which forms the other raceway of this bearing. Said ball bearing is supported by a cap 5 removably attached to the housing 4 by means of bolts 24 and covering an opening in the side of the housing 4 through which the shaft 1 passes and is accessible as is also the ball bearing just described. Centrally also of each shaft 1 within casing 4 is a clutch member 25 consisting of a sleeve which slides on the shaft and is internally splined or grooved to engage corresponding splines or grooves 2 running for a certain distance on the shaft 1. Said clutch 25 has its sleeve-like form provided at one end with teeth 26 and at the other end with teeth 27 while at the middle point thereof is an external circumferential groove 28 that is loosely engaged by an arm 29 projecting laterally from the clutch operating member 30, said member thus having two of these arms 29 which project in opposite directions so that one may engage the clutch 25 belonging to one shaft 1, while the other engages the clutch 25 belonging to the other shaft 1.

On each shaft 1 is also a bevel pinion 9 formed at one side with a sleeve 31 that loosely surrounds the shaft 1 and which carries a raceway 11 belonging to a ball bearing whose series of balls 12 lie between the raceway 11 and another raceway 13 which is firmly held within a bracket 14 cast integral with or firmly attached to the inner wall of the housing 4. This ball bearing made up of the parts just described is closely contiguous to the other ball bearing having the series of balls 7 and located within the cap 5; furthermore, the bevel pinion 9 has on the side opposite to the sleeve 31 another sleeve 15 carrying a ring 16 forming one of the raceways of a ball bearing whose balls, of which there are preferably two series, as shown at 17, lie between this raceway 16 and another raceway 18 that is firmly supported in a suitable bracket 32 which is cast integral with or securely fastened to the inside of the frame of the housing 4. A ring 33 surrounds the sleeve 15, being let into a shallow groove therein and it locks the raceway 16 on the sleeve-like extension 15 of the pinion 9. Said sleeve 15 is furthermore provided with a suitable number of teeth 34 adapted to be engaged by the contiguous teeth 26 of the clutch sleeve 25 whenever the latter is brought into engagement therewith, as it is at the time when the device 30 and its arms 29 are shifted so as to slide the clutch 25 on the splined section 2 and thus cause the shaft 1 to be so connected with the pinion 9 that it will actuate the same and communicate motion, as I shall explain, to the adjoining shaft section 20 so as to revolve the same in a certain direction.

The revolution of the pinion 9 communicates motion through the bevel gear wheel 10 which is shaped at the center with a hub provided with a sleeve-like extension 37 in one direction and another sleeve-like extension 36 in another direction, the interior of the hub and the sleeve 37 being grooved or splined so as to engage the grooved or splined end 35 of the shaft 20, to which I have already said one of the drive wheels (not shown) is secured. The sleeve 36 is surrounded by a close fitting ring 42 which forms one of the raceways of a ball bearing, between which raceway a couple of rows of balls 43 are placed, said balls being surrounded by another raceway 44 which is carried by the frame 32 fastened to the inside of the housing 4 in any desired manner, it being unnecessary to portray all the details. Also, it will be seen that the sleeve 37 carries a ring 38 which forms one of the raceways of another ball bearing whose two rows of balls 39 lie between the ring 38 and another raceway 40 supported in a frame 41 which is suitably held in the housing 4 by means of a web 46, or otherwise. In this way it will be seen that the shaft 1, when the bevel pinion 9 is clutched to said shaft, will in its revolution actuate the bevel gear wheel 10 and drive the shaft 20, thus communicating motion to the drive wheel on said shaft, all the parts having ease and smoothness of motion given to them by virtue of the ball bearings in which they are supported in the manner I have explained.

I must moreover point out that at the other end of the shaft 1 inside of the housing 4 a pinion 45 similar to the pinion 9 is carried in ball bearings and engages the teeth of the gear wheel 10 so that when the clutching mechanism is reversed the shaft 1 is enabled to impart a reverse motion through this pinion 45 and gear wheel 10 to the shaft 20 and the drive wheel thereon. The shaft 1 has a section 47 of somewhat larger diameter than that of the main length of the shaft, being substantially the same diameter as the splined portion 2, and this section 47 is located within a cover 48 which is secured to the housing 4 by means of bolts 49, said cover 48 containing a ball bearing consisting of a series of balls 50, a raceway 51 which is tight on the section 47, and another raceway 52 which is tight within the cover 48, this ball bearing being practically the same as the ball bearing at the opposite end of the shaft 1 which contains the balls 7. Also it will be seen that the pinion 45 is provided with a sleeve 53 on one side and a sleeve 54 on the other side, the sleeve 53 being surrounded tightly by a raceway 55, between which and another raceway 56 is a series of balls 57, said raceway 56 being carried in a bracket 58 properly secured to the inside of the housing 4 and said ball bearing being substantially the same as the inner ball bearing at the other end of the shaft for the pinion 9 and having a series of balls 12. Further the sleeve 54 has a series of teeth 59 which engage at times with the teeth 27 of the clutching sleeve 25 when the latter is shifted on the splined section 2 for the purpose of engaging them. Said sleeve 54 is surrounded by a tight ring 60 between which and another ring 61 is a series, or preferably two series, of balls 62, said ring 61 being carried in the end of the frame 32 which at its opposite end, as I have already explained, supports a similar ball bearing which uses the balls 17. Ring 60 is held in place by a wire ring as shown. Thus it will be seen that the pinion 45 is arranged to operate easily and smoothly in connection with the shaft 1 in suitable ball bearings for the purpose of transmitting power to the adjacent shaft 20 when the clutch is reversed so that the wheel on shaft 20 will have the same positive and steady action in the reverse direction that it will also have in the opposite direction when the shaft 1 is clutched to the pinion 9 and the latter transmits power to the shaft 20 through gear 10.

It will be understood, of course, that so far I have only described one of the parallel shafts 1 and its accompanying gearing for the purpose of transmitting motion forward or back to one of the right-angled shafts 20, but that the companion shaft 1 is similarly arranged for the purpose of driving the other shaft 20 to which another drive wheel is attached. The clutch actuating member 30 has already been seen to have oppositely-projecting arms 29 which loosely engage the clutches 25. This clutch operating member comprises essentially an endwise movable shaft, one end of which, as seen in Fig. 2, is splined at 63 to enable it to be reciprocated in a stationary sleeve 64 without rotating, said sleeve being bolted or otherwise firmly secured in the side of the housing 4. At the opposite side of the housing 4 the member 30 is provided with an automatic ball locking device or some equivalent contrivance comprising a ball 65 and a spring 66 pressing against the same so as to enable it to engage one or the other of the notches 67 of which there may be a series of as many as may be desired, while to the front end of the shaft 30 outside of the housing 4 is a rod 68 which may connect up with any desired leverage whereby this clutch actuating member 30 may be reciprocated for the purpose of enabling the arms 29 to shift the clutches 25 into engagement with the notches 34 of pinion 9 or the notches 59 of the pinion 45 in driving in one direction or the other, and when so shifted backward or forward the automatic locking ball 65 will hold the clutch operating member 30 in any position in which it may be placed, although not with sufficient pressure but that it can be easily actuated again at any time by the rod 68. Further it will be observed that the clutch operating member 30 may be made in one part, as shown in Fig. 1 where rod 68 causes a joint and similar action of the two clutches 25, or the member 30 may be made in two parts as shown at 30$^a$ in Fig. 4, each half having one of the arms 29 and being operated by separate rods 68$^a$ so that the clutches 25 are thus operated independently.

I have so far been describing the construction and arrangement of the parts shown in Figs. 1 and 2. Turning now to Figs. 4 and 5, it will be seen that the arrangement is somewhat modified, particularly the way in which the ball bearings are supported and applied. In place of the pinions 9 and 45 I use the pinions 69 and 70. An explanation of one of the shafts will do for both, there being the same two parallel shafts, but made in a slightly different way as shafts 1$^a$. The rear end of the shaft 1$^a$ has a splined portion 3 similar to the portion 3, Fig. 1, and this is carried in a ball bearing like that shown in Fig. 1, consisting of raceway 6, series of balls 7, and a raceway 8, all covered by a plate 5 secured by bolts 24. The pinion 69, however, although of a shape and function similar to the pinion 9, is provided with a cup-shaped sleeve 71 containing a raceway 72, a series of balls 73, and a raceway 74, the balls 73 being located between the two raceways, while the raceway 72 seats upon the enlarged splined portion 75 of said shaft, and the raceway 74 is fitted tightly inside of the sleeve 71 so that in this way it will be seen that this ball bearing is supported within an extension of the gear 69 and requires no outside support on the casing. Also the pinion 69 is provided on the other side with another cup-shaped sleeve 76 containing a ball bearing consisting of a couple of series of balls 77, and outer raceway 78 fitted in the sleeve 76 and an inner raceway 79 seated upon the enlarged splined portion 80 of the shaft, the said ball bearing being held in place by the ring 81 surrounding the shaft 1ª while this cup-shaped sleeve 76 is provided with a series of notches 82 which are adapted to engage the teeth 26 of the clutching sleeve 25, which, as in Figs. 1 and 2, is provided with an encircling groove 28 that is engaged by the arm 29 of the clutch-operating member 30ª. Instead of member 30ª, member 30 can be used in this combination. Also member 30ª may be used in the combination in Fig. 1.

The pinion 69 meshes with the teeth of a bevel gear wheel 83 similar to the bevel gear wheel 10 and having a central sleeve 84 integral with its hub, which sleeve is interiorly splined on the outer end thereof to engage the splined portion 35 of the shaft 20. Surrounding the sleeve 84, which is preferably made of somewhat larger diameter near the center of the gear wheel 83 than toward the end of said sleeve, are two ball bearings, the one surrounding the sleeve part of larger diameter consisting of an inner ring 85, balls, preferably two series, 86, and an outer ring 87, while the ball bearing surrounding the outer portion of the sleeve 84, which I have said is of somewhat less diameter, consists of the inner ring 88, the balls 89, preferably two series, and the outer ring 90, said outer rings 87 and 90 fitting tightly within a support 91 which is preferably held within the housing 4 by the webs 92 and 93 or in any other convenient and suitable manner.

With respect to the pinion 70 it will be seen that it is provided on the side toward the clutch 25 with the cup-shaped sleeve 94 wherein is a ball bearing consisting of an inner raceway 95, an outer raceway 96, and balls 97, while on the opposite side the pinion 70 is provided with the cup-shaped sleeve 98 containing a ball bearing consisting of an inner raceway 99 and an outer raceway 100 and a series of balls 101. The inner raceway 100 fits closely upon the section 102 of the shaft 1ª which is a section of larger diameter and is longer than the corresponding section 47 of the shaft 1 in Fig. 1 because this longer section 102 not only carries the ball bearing having balls 101, but it also revolves within another adjacent ball bearing similar to the one in Fig. 1 and consisting of an inner raceway 51, balls 50, and an outer raceway 52, all suitably carried within a cover 48 secured to the housing 4 by means of bolts 49. The cup-shaped sleeve 94 on the pinion 70 is provided with a series of teeth 103 that are adapted to be engaged by the teeth 104 on the end of the sleeve 25 opposite to where the teeth 26 are situated for the reverse movement of the clutch for the purpose of driving the shaft 20 in the opposite direction. The main difference between the mechanism in Fig. 4 and that in Fig. 1 is that in Fig. 4 the supports for the pinions are all on the drive shaft, instead of requiring separate supports brought up from the bottom or some other part of the casing itself.

It will be understood that both shafts 1ª are similarly supported and arranged and that the clutch mechanism is the same for both, that the clutches may be jointly or separately moved backward or forward accordingly as the clutch operating member consists of a single part 30 or two parts 30ª; and that many modifications in the precise construction and arrangement may be made without changing the function of result.

A very simplified form of the invention is shown in Fig. 6 adapted for those cases where a reversal of the movement of the shafts by clutches is not needed, but the reversal is attained by a reversal of the driving motor itself, a thing which is not always possible or convenient. Here the casing 4, the two parallel main shafts 1, 1, which revolve preferably in opposite directions, the right-angled drive shafts 20, and many other parts are the same as in the other views, excepting that the surface of the shafts 1 is somewhat differently made because the clutching mechanism is entirely omitted, this form of the invention being intended to serve with a case where the main shafts are independently driven and are reversible without the aid of a clutch. The rear ends of the shafts 1 are supported in ball bearings like the bearings shown in Figs. 1 and 2 where there is a series of balls 7. On each shaft is a pinion 70 which meshes with a gear wheel 83 constructed and supported in the same manner as I have shown in Fig. 4, it having two ball bearings, one with the balls 89 and the other with the balls 86. The pinions 70 may be made integral with shaft 1 or may be slipped over the splined or grooved section 105 of said shaft and held by a ring 106, while there is a collar 108 encircling the shaft 1 between the pinion 70 and a ball bearing like that shown in Figs. 1 and 4, the balls of which are indicated by 50. A simple arrangement of this section consisting merely of parallel main shafts, right-angled drive shafts, and suitable gearing connections between the two, the main shafts being actuated by separate motive power so that they can be driven preferably in opposite directions and can be reversed without the aid of any clutching device and without the numerous parts found in the examples of the invention illustrated in Figs. 1 and 4, so that this form will be found to be a useful and valuable form of the invention, and applicable to a great variety of uses.

In Fig. 7 I have delineated the form of the invention which is shown in Fig. 4 excepting that the clutch operating member is differently actuated. Said member employs no horizontal shaft like members 30 or 30ª, but does use the arms 29 which engage the circumferential grooves 28 in the clutches 25, these two arms 29 being integral with each other at their middle portions where they are secured to a vertical pin 107, as shown in Fig. 8, said pin being supported at its lower end in a bearing 108 in the casing 4 while its upper end projects through the cover plate 4ª of said casing and is provided with an arm 109 to which an operating link 110 is pivoted. The said link 110 may run to the front end of the automobile, or to any other point where it can be conveniently provided with a lever or system of levers for imparting motion thereto, and as the link 110 is reciprocated, it will obviously move the arm 109 and thus shift the clutches 25, moving one in one direction and the other in the other direction, and thus causing the shafts 1 or 1ª to be rotated in the same or opposite directions, which directions may be reversed by a reversal of the movement of the link 110.

A modified form of this combination for actuating the clutches and causing their parts to engage and disengage is shown in Figs. 9 and 10 where it will be seen that I still employ the vertical pin 107 which is rigidly affixed to one of the arms 29 but is surrounded throughout its upper portion by a sleeve 111 fastened to the other arm 29 and which sleeve 111 has thereon an arm 113, to which is attached a link 114. As the sleeve 111 is attached to one of the arms 29 and said arm can be actuated by one of the links, as 114, and as the pin 107 is attached to the other arm 29, said arm can be actuated as I have already explained by one of the links, as 110, and hence these links 110 and 114, as shown in Fig. 10, may be operated together in the same direction, which may be a forward one or a reverse one, the effect of which would be to shift the clutch sections both in the same direction forward or back so that they can be operated separately, depending entirely upon the operating means which can be provided for these links, which means can vary widely within the limits of my invention.

Many changes in the precise construction, arrangement and combination of the various parts may be made without exceeding the scope of the invention, and I, therefore, reserve the liberty of modifying, rearranging, recombining and altering the specific embodiments, which I have herein given as examples, in order that the invention may be made to produce the most efficient results in actual practice. It will be understood that the splined portions which lie within certain of the ball bearings are so made and are so enlarged as to have the same diameter as the splined section on which the clutching portions travel in order that these parts will fit the ball bearings and will be allowed to pass through the clutch members when the parts are being assembled. It is unnecessary, however, that the diameters of the splined portions should be larger than the remainder of the shafts as the entire shafts within the casing may have the same diameter with the necessary splined portions cut therein at intervals, and also it will be found possible in many cases to use portions of enlarged diameter that are smooth and not grooved in place of those that are grooved or splined, it being only essential that all the various parts should be enabled to pass each other when they are fitted together or taken apart in the processes of assembling or disassembling. It must be also further noted that I am not confined to the use of ball bearings in the manner shown and described, whether they are of one series or two series in a single bearing, but that plain bearings may be utilized instead of roller bearings, or taper bearings, or any other similar and equivalent kind; further that the invention is applicable to a rear wheel drive, either one or both wheels, or to a front wheel drive or a four wheel drive, and that whichever wheel or wheels may be thus driven, it will be easy to connect up by means of gears and shafts with certain of the other wheels sometimes at the opposite end of the vehicle, and give effective results in transmission and driving of a positive character through wheels on both sides of the car or otherwise, and also that various other suggestions of change and modified forms may be devised within the broad meaning of the invention.

Having thus described my invention, what I claim as new and desire to secure by Letters Patent, is:—

1. In a device of the class described, the combination of parallel main shafts, right-angled drive shafts, means for supporting the shafts, gearing connections between the right-angled shafts and the main shafts, and clutch devices for throwing these gears into and out of action, together with a central clutch-operating member between the two main shafts, and means for controlling said member from any desired point.

2. In a device of the class described, the combination of parallel main shafts, right-angled drive-shafts, gears between the main shafts and the other shafts, clutch devices for throwing said gears into and out of connection, means for actuating said clutches jointly in a forward or reverse direction, and means for controlling the clutch-operating means from a distance.

3. In a device of the class described, the combination of parallel main shafts, right-angled drive shafts, means for supporting the shafts consisting of a casing, ball bearings at the ends of the portions of the main shafts within the casing and also at the ends of right-angled shafts within the casing, bevel pinions on each main shaft, bevel gears engaged by said pinions and carried on the right-angled shafts, clutch sections sliding on the main shafts and adapted to respectively engage the pinions and clutch the same to the shafts in a forward or reverse motion of the latter, and means for actuating said clutches.

4. In a device of the class described, the combination of parallel main shafts, right-angled drive shafts, means for supporting said shafts consisting of ball bearings at the ends of the portions thereof within the casing, a casing surrounding all the parts, a pinion on each main shaft, a bevel gear on each right-angled shaft engaged by the pinion, and a ball bearing for supporting the inner end of each right-angled shaft, clutch sections sliding on the main shafts and adapted to respectively engage the pinions and clutch the same to the shafts.

5. In a device of the class described, the combination of parallel main shafts, right-angled drive shafts, a casing surrounding portions of these shafts, ball bearings supported by the casing and carrying the ends of the portions of the main shafts within said casing, and other ball bearings supported by the casing and carrying the inner ends of the right-angled shafts, a pair of bevel pinions on each main shaft, a bevel gear wheel on the inner ends of the right-angled shafts meshing with said pinions, ball bearings for supporting the inner ends of said shafts, sliding clutch members on the main shafts engaging said pinions adjacent to the inner ball bearings, and means for shifting said clutches so that the motion of the main shafts may be communicated to the right-angled shafts to drive them forward or back.

6. In a twin driving mechanism for automobiles and the like, the combination of parallel main shafts, right-angled drive shafts, a pinion on each main shaft, and a bevel gear wheel on each right-angled shaft, the bevel gear wheels and the pinions being in mesh with each other, together with clutches and a clutch operating member between the main shafts, and means for controlling the said member from any desired point.

7. In a twin driving mechanism for automobiles and the like, the combination of parallel main shafts separately driving in the same or opposite directions, right-angled drive shafts, a casing surrounding the parts and receiving portions thereof, bevel gear wheels on the ends of the right-angled shafts, one or more pinions on the main driving shafts engaged by the bevel gear wheels, ball bearings for the ends of all of the shafts within the casing, and auxiliary ball bearings adjacent to the main ball bearings, said auxiliary ball bearings being supported by the main casing, and clutch devices for operating the gear sets.

8. In a twin driving mechanism for automobiles and the like, the combination of parallel main shafts, right-angled drive shafts, gearing between the main shafts and the drive shafts consisting essentially of a pair of pinions on each main shaft and the gear wheel on the adjacent end of the right-angled shaft intermeshing with said pinions so that when one pinion acts to drive the bevel gear wheel, the other pinion will be driven idly, ball bearings supported by the pinions, and ball bearings for supporting the right-angled shafts and also the rear ends of the main driving shafts, and clutch devices for operating the sets of gears.

In testimony whereof I affix my signature.

WILLIAM J. P. MOORE.

Copies of this patent may be obtained for five cents each, by addressing the "Commissioner of Patents, Washington, D. C."